Nov. 20, 1928.
T. ZUSCHLAG
1,692,530
METHOD AND APPARATUS FOR LOCATING ORE BODIES
Filed May 15, 1925
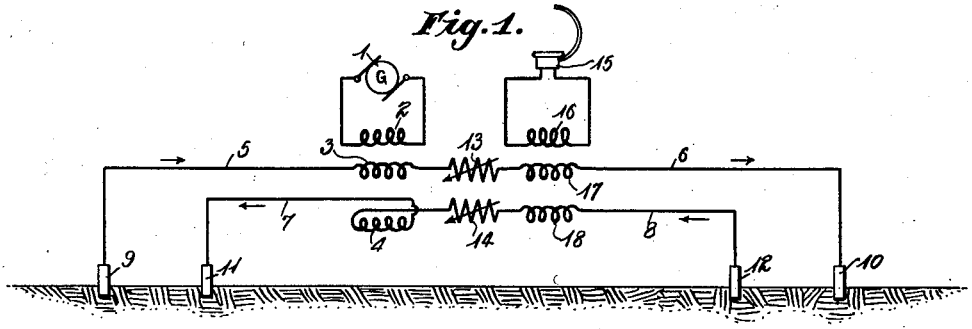
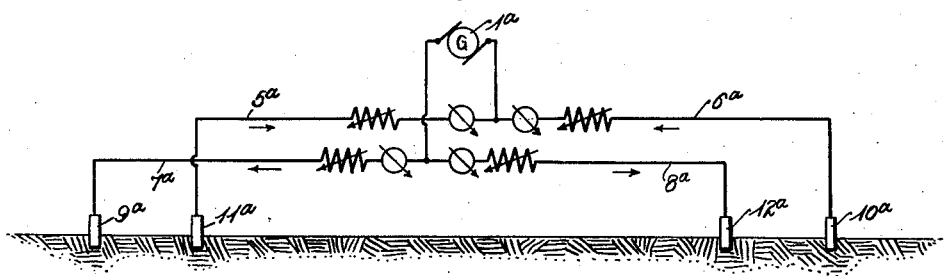
Inventor
Theodore Zuschlag Patented Nov. 20, 1928.

1,692,530

UNITED STATES PATENT OFFICE.

THEODORE ZUSCHLAG, OF NEW YORK, N. Y., ASSIGNOR TO THE TAUMAC CORPORATION, OF NEW YORK, N. Y., A CORPORATION OF NEW YORK.

METHOD AND APPARATUS FOR LOCATING ORE BODIES.

Application filed May 15, 1925. Serial No. 30,478.

My invention relates to the art of locating ore bodies by generating subterranean electrical currents and observing the characteristics of the magnetic fields resulting from such currents.

It is known that subterranean currents or waves will be modified, both as to direction and intensity, by variations in conductivity of the various rocks, ores and other materials of the earth's crust, and that corresponding modifications, which may be detected by suitable instruments at or above the earth's surface, will be found in the electrical or magnetic fields resulting from the subterranean currents or waves.

It has been proposed to take advantage of these known facts in locating ore bodies beneath the surface of the earth, but a serious practical difficulty has been encountered by reason of the fact that the instruments and leads employed on the surface, for generating the subterranean currents, produce a superterranean current whose magnetic field is so much stronger than the field of the subterranean currents as to seriously interfere with the detection and observation of the latter.

The object of my invention is to eliminate the difficulty referred to and to that end my invention consists in a novel method and apparatus whereby the single superterranean current heretofore employed is replaced by two or more currents which lie close together and substantially parallel to one another and which flow in opposite directions, the strength of the current in one direction being substantially equal to the strength of the current in the other direction, thus suppressing or reducing to a practical minimum the local magnetic field. My invention further consists in grounding the superterranean currents, which produce no appreciable field, in such manner as to cause subterranean currents to flow in one direction, or in opposite directions with different intensities, whereby a magnetic field will be produced which reflects the character of the subterranean currents without interference from the superterranean currents.

In the accompanying drawings, Figs. 1 and 2 illustrate diagrammatically two ways in which the invention may be carried out, but it will be apparent to anyone skilled in the art that the underlying principle may be embodied in other forms and that variations in detail of the systems illustrated may be made without departing from the spirit of the invention.

Referring to Fig. 1, which illustrates the preferred embodiment of my invention, 1 represents a generator of current. I prefer to employ a generator of high frequency alternating current but this is not of the essence of my invention and results may be obtained with any known or suitable type of electrical current or electromagnetic waves.

The generator 1 is in circuit with the primary coil 2 of a transformer having two secondary coils 3, 4. The coils 3, 4 are oppositely wound and connected by wires 5, 6 and 7, 8 respectively, with grounded electrodes 9, 10 and 11, 12. This mode of grounding the circuits is preferred but direct or capacitative coupling with the ground may be employed if desired. The wires 5, 6 lie close to and parallel to the wires 7, 8, respectively and by means of variable resistances 13, 14 the currents in the two circuits may be made equal. To insure an accurate balance of the currents any suitable instrument for measuring the currents may be used or, a telephone receiver 15 in circuit with a coil 16 which is inductively coupled with the coils 17, 18 may be employed for detecting an excess of current in one circuit as compared with that in the other circuit.

The arrangement described will eliminate or reduce to a negligible minimum the local field of the superterranean portions of the circuits in the region between electrodes 11 and 12, since the currents in those portions are opposite in direction and may be made equal in magnitude.

With respect to the subterranean portions of the two circuits, however, there will be no balance of currents and a detectible magnetic field will result. This results from the fact that the path through the ground between electrodes 9 and 10 is longer than the path from 11 to 12. Thus, the ground current from 11 to 12 will be stronger than that from 10 to 9 and the field of the former will be stronger than the field of the latter. Altho the two fields of the subterranean currents will neutralize each other to some extent there will be a differential field which may be readily detected in the absence of interference from the currents above ground.

For best results the intervals 9 to 11 and 12 to 10 should be not less than one-tenth of the interval 11 to 12.

In the arrangement according to Fig. 2, instead of the inductive coupling shown in Fig. 1 the generator 1ª is connected directly to middle points of the wires 5ª, 6ª and 7ª, 8ª. The current divides and flows in opposite directions in the two branches of each circuit and the currents are always opposite in direction in those portions of the two circuits which are parallel and contiguous to one another. Thus, the local field of the exposed portions of the circuits is substantially eliminated in this instance also. For maintaining a balance between the circuits I insert variable resistances and galvanometers or other current indicators in each branch of each circuit.

The disposition of the electrodes 9ª, 11ª, 12ª, 10ª is substantially the same as in Fig. 1 but the connections to the generator are different. The current in the phase illustrated, flows from the generator, divides and flows in both directions in the wires 7ª, 8ª to the electrodes 9ª, 12ª. In the ground, the current again divides, the larger current going from 9ª to 11ª and from 12ª to 10ª; but appreciable currents take the longer courses 9ª to 10ª and 12ª to 11ª. The currents which take these latter courses are opposite in direction but of unequal strength, since the distance 9ª to 10ª is greater than the distance 12ª to 11ª. Therefore a magnetic or electrical field will result which can be detected above ground and without interference from the external portions of the circuits if the observations are taken between the points 11ª and 12ª.

For detecting, charting, and interpreting the ground currents produced by my invention, any known or suitable instruments and methods may be employed. For example, the equipotential method described in the patent to Schlumberger, No. 1,163,468 is adapted to be used with my system or a direction finder, such as a loop antenna in circuit with a telephone receiver, may be employed for ascertaining the courses of the ground currents. As the novel features of my invention are confined to the production of subterranean currents it is unnecessary to describe in detail the instruments for observing and the methods of interpreting those currents, which are well known in the art.

I claim:

1. In the art of locating ore bodies by observing the characteristics of subterranean electric currents, the method of generating subterranean currents which consists in causing a flow of current between spaced points, causing another opposite flow of current of equal magnitude and adjacent to and parallel with the first-mentioned flow, and grounding said currents at spaced points to produce subterranean currents.

2. In the art of locating ore bodies by observing the characteristics of subterranean electric currents, the method of generating subterranean currents which consists in causing a flow of current between spaced points, causing another opposite flow of current of equal magnitude and adjacent to and parallel with the first-mentioned flow, and grounding said currents at differentially spaced points to cause a resultant flow of subterranean current.

3. Apparatus for locating ore bodies comprising in combination, means for causing a flow of electric current between spaced points, means for causing another opposite flow of electric current of equal magnitude and adjacent to and parallel with the first mentioned flow, and means for grounding said currents at spaced points to produce subterranean currents.

4. Apparatus for locating ore bodies comprising in combination, means for causing a flow of electric current between spaced points, means for causing another opposite flow of electric current of equal magnitude and adjacent to and parallel with the first mentioned flow, and means for grounding said currents at differentially spaced points to cause a resultant flow of subterranean currents.

5. Apparatus for locating ore bodies comprising in combination an alternating current generator, a primary coil in circuit with said generator, two secondary coils inductively coupled with said primary coil, parallel conductors reversely connected to opposite ends of said secondary coils, respectively, and means for grounding the extremities of said conductors at spaced points.

6. Apparatus for locating ore bodies comprising in combination, an alternating current generator, a primary coil in circuit with said generator, two secondary coils inductively coupled with said primary coil, parallel conductors reversely connected to opposite ends of said secondary coils respectively, means associated with said conductors for varying the resistance of either to regulate the current therein, and means for grounding the extremities of said conductors at spaced points.

7. Apparatus for locating ore bodies comprising in combination, an alternating current generator, a primary coil in circuit with said generator, two secondary coils inductively coupled with said primary coil, parallel conductors reversely connected to opposite ends of said secondary coils, respectively, and means for grounding the extremities of said conductors at spaced points, the grounding points for one secondary coil being located between and substantially in line with the grounding points of the other secondary coil.

THEODORE ZUSCHLAG.